(No Model.)
J. HARRELL.
DRIED FRUIT CLEANER.
No. 395,621. Patented Jan. 1, 1889.
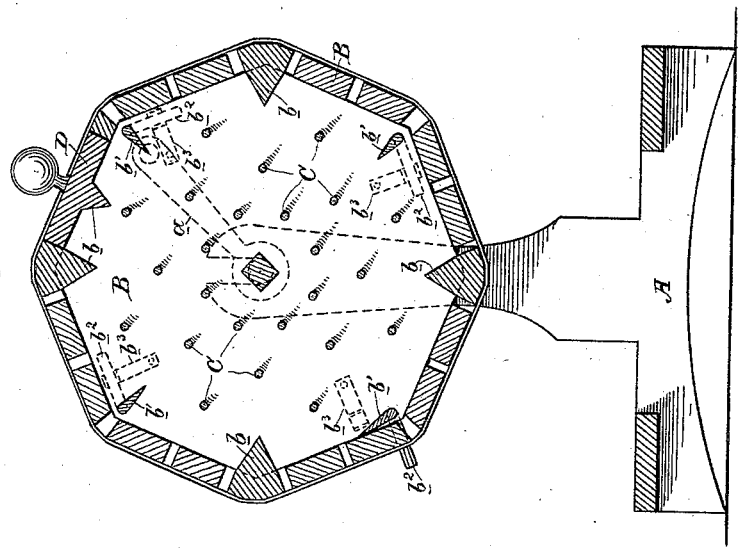
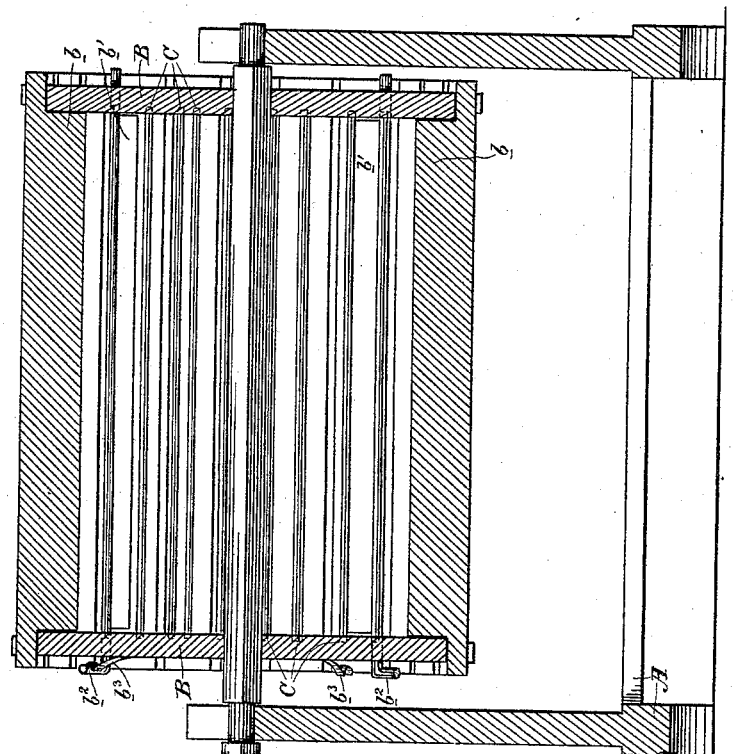
Witnesses:
Geo. H. Strong.
J. H. Krouse
Inventor
John Harrell
By Dewey & Co.
Atty.

UNITED STATES PATENT OFFICE.

JOHN HARRELL, OF PLYMOUTH, CALIFORNIA.

DRIED-FRUIT CLEANER.

SPECIFICATION forming part of Letters Patent No. 395,621, dated January 1, 1889.

Application filed May 31, 1888. Serial No. 275,651. (No model.)

*To all whom it may concern:*

Be it known that I, JOHN HARRELL, of Plymouth, Amador county, State of California, have invented an Improvement in Dried-Fruit Cleaners; and I hereby declare the following to be a full, clear, and exact description of the same.

My invention relates to the class of machinery for handling fruit, and especially to cleaning and freshening up or renovating dried fruit; and my invention consists in the peculiar construction and combination of devices, which I shall hereinafter fully describe and claim.

Referring to the accompanying drawings for a more complete explanation of my invention, Figure 1 is a vertical longitudinal section of my cleaner. Fig. 2 is a vertical cross-section of same.

A is a frame or stand, in the standards of which is mounted the hollow drum or barrel B, its axle being provided with a crank, $a$, for rotating it. The periphery of the barrel is made up of separated or spaced slats or pieces, some of which are made triangular in cross-section, so that their inner edges project into the barrel and form buckets or elevators $b$. These are located at intervals around the barrel, and in order to form other buckets more positive in their lifting action I place a few flat strips, $b'$—preferably metal plates—within the barrel, along its inner surface. These are not stationary, but have a pivotal movement, in order to cause them to extend radially from the periphery of the barrel, or to lie flat against it. To so move them, I carry one of their journal ends through the barrel-head and turn it to form a crank, $b^2$, which is engaged by a spring-catch, $b^3$, in order to hold the plates or buckets $b'$ in position for working; but upon releasing the crank from the catch the bucket may be turned to lie flat on the inner surface of the barrel.

Within the barrel and throughout its interior space are wires or rods C, which extend in a general longitudinal direction, being separated sufficiently to let the fruit pass or drop between them. An entrance-opening covered by a lid, D, is provided for charging the barrel and discharging the fruit.

The operation of the machine is as follows: The barrel is charged with the fruit and then rotated. The buckets or flanges within pick and carry it up and drop it through or between the wires or rods C, which are sufficiently numerous and close enough together to cause the fruit in passing between them to scrape against them on all sides, and thus they remove the fuzz, &c., and thoroughly clean the fruit, the dust, &c., dropping out through the spaces between the slats of the periphery. These spaces also afford opportunity for the sulphurous-acid vapor to enter, when such is used.

The object of the pivotal motion given to the buckets $b'$ is to avoid holding the fruit back when discharging it.

What I claim as new, and desire to secure by Letters Patent, is—

An improved fruit-cleaning machine consisting of a rotary hollow drum formed of separated or spaced slats, some of which are triangular in cross-section, forming buckets or elevators, the movable flat strips $b'$, forming other buckets or elevators, each provided with a crank and holding mechanism, and the yielding wires throughout the whole interior of the drum, for removing the fuzz as the fruit passes between them, as herein described.

In witness whereof I have hereunto set my hand.

JOHN HARRELL.

Witnesses:
JOHN J. DAVIS,
JONATHAN SALLEE.